United States Patent
Sun et al.

(10) Patent No.: US 11,621,854 B2
(45) Date of Patent: Apr. 4, 2023

(54) ANONYMOUS AND VERIFIABLE COMPUTER-IMPLEMENTED SELECTION SYSTEM

(71) Applicant: SAP SE, Walldorf (DE)

(72) Inventors: Xun Sun, Shanghai (CN); Xiaoxiao Gu, Shanghai (CN); Yukching Leung, Palo Alto, CA (US)

(73) Assignee: SAP SE, Walldorf (DE)

( * ) Notice: Subject to any disclaimer, the term of this patent is extended or adjusted under 35 U.S.C. 154(b) by 228 days.

(21) Appl. No.: 16/246,882

(22) Filed: Jan. 14, 2019

(65) Prior Publication Data

US 2020/0228344 A1    Jul. 16, 2020

(51) Int. Cl.
| | |
|---|---|
| *H04L 9/32* | (2006.01) |
| *G06F 16/22* | (2019.01) |
| *G06Q 10/06* | (2023.01) |
| *G06Q 10/10* | (2023.01) |
| *G06Q 10/0639* | (2023.01) |
| *G06Q 10/1053* | (2023.01) |
| *H04L 9/08* | (2006.01) |

(52) U.S. Cl.
CPC ........... *H04L 9/3247* (2013.01); *G06F 16/22* (2019.01); *G06Q 10/06398* (2013.01); *G06Q 10/1053* (2013.01); *H04L 9/0866* (2013.01)

(58) Field of Classification Search
None
See application file for complete search history.

(56) References Cited

U.S. PATENT DOCUMENTS

| | | | | |
|---|---|---|---|---|
| 5,638,447 | A  * | 6/1997 | Micali | H04L 9/3255 380/30 |
| 7,174,460 | B2 * | 2/2007 | Horita | G06F 21/64 713/176 |
| 8,189,789 | B2 * | 5/2012 | Coan | H04L 9/3249 380/273 |
| 8,989,390 | B2 * | 3/2015 | Gantman | G06F 21/602 380/286 |
| 9,641,341 | B2 * | 5/2017 | Oberheide | H04L 9/0863 |

(Continued)

FOREIGN PATENT DOCUMENTS

EP            1469429 A1 * 10/2004      ......... G06Q 20/3674

OTHER PUBLICATIONS

Hardwick, Freya Sheer et al., "E-Voting With Blockchain: An E-Voting Protocol with Decentralisation and Voter Privacy", IEEE Conferences, Jul. 1, 2018. (Year: 2018).*

*Primary Examiner* — Neha Patel
*Assistant Examiner* — Clay C Lee
(74) *Attorney, Agent, or Firm* — Klarquist Sparkman, LLP (57) ABSTRACT

User-generated messages encapsulating selections from each of a plurality of entities for a selection task having a selection option are received via one or more interfaces presented by a selection processing system. For each selection, a different share of a signing key is obtained that has an identity associated with the selection task. For each selection, a different partial signature is generated by signing the messages using the associated share of the signing key. The partial signatures are combined into a threshold signature if a number of entities for a selection option specified by the task exceeds a pre-defined threshold. Data characterizing the results of the selection task can then be provided.

20 Claims, 6 Drawing Sheets

(56) References Cited

U.S. PATENT DOCUMENTS

| | | | |
|---|---|---|---|
| 2002/0013898 A1* | 1/2002 | Sudia | G06Q 20/02 713/155 |
| 2010/0180116 A1* | 7/2010 | Coan | H04L 9/3249 713/168 |
| 2011/0066647 A1* | 3/2011 | Chan | G06F 16/2471 707/770 |
| 2011/0083064 A1* | 4/2011 | Kagan | H04L 63/123 714/807 |
| 2011/0178940 A1* | 7/2011 | Kelly | G06Q 10/1053 705/321 |
| 2011/0246766 A1* | 10/2011 | Orsini | H04L 9/0894 713/160 |
| 2013/0046704 A1* | 2/2013 | Patwa | G06Q 10/06 705/321 |
| 2016/0191513 A1* | 6/2016 | Tomlinson | H04L 9/321 713/168 |
| 2018/0302217 A1* | 10/2018 | Hevia Angulo | H04L 9/085 |
| 2020/0162246 A1* | 5/2020 | Schouppe | H04L 9/0637 |

\* cited by examiner

ANONYMOUS AND VERIFIABLE COMPUTER-IMPLEMENTED SELECTION SYSTEM

TECHNICAL FIELD

The subject matter described herein relates to computer-based techniques that provide anonymous and verifiable selections by entities.

BACKGROUND

Computer-based selection is being increasingly adopted for a variety of tasks. Technical difficulties can arise when numerous selecting entities are involved in connection with verifying individual selections while, at the same time, allowing such selections to be anonymous.

SUMMARY

In one aspect, user-generated messages encapsulating selections from each of a plurality of entities for a selection task having a selection option are received via one or more interfaces presented by a selection processing system. For each selection, a different share of a signing key is obtained that has an identity associated with the selection task. For each selection, a different partial signature is generated by signing the messages using the associated share of the signing key. The partial signatures are combined into a threshold signature if a number of entities for a selection option specified by the task exceeds a pre-defined threshold. Data characterizing the results of the selection task can then be provided. In this context, provided can include at least one of: displaying the data characterizing results of the selection task, storing the data characterizing results of the selection task in physical persistence, loading the data characterizing results of the selection task into memory, or transmitting the data characterizing results of the selection task to a remote computing system.

The threshold signature can be caused to be stored in a database. Further, the partial signatures can be caused to be stored in a database and removed (i.e., deleted, etc.) once the threshold signature is stored therein.

The selection task can relate to various human capital tasks including, for example, a hiring of one of a plurality of potential job candidates, a promotion decision for an existing employee, and/or a performance review for an existing employee.

User-generated input can be received selecting selection parameters specifying the selection task, n entities, and a threshold t which needs to be exceeded for the selection task. Thereafter, an identity-based signing key can be generated using the selection as an identity for the key. The generated identity-based signing key can be split into n different shares. Each of the n signing key shares can then be assigned to a respective one of the n entities.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The current subject matter provides many technical advantages. For example, the current subject matter provides selection verifiability through the use of identity-based threshold signature schemes. In particular, everyone can verify if the final signature is valid for a given selection topic and associated option. Further, the current subject provides anonymity because the signing key shares and partial signatures are never revealed. Once the selection process is complete, there is no more information about which entity selected which option. Still further, the current subject matter provides selection isolation by way of the security properties of identity-based threshold signature schemes. As selection tasks are used as identities, signing keys and signatures belonging to one selection task are irrelevant to another selection task.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to a computer-implemented selection processing system and related techniques. The selection processing system can output a valid result if and only if majority (exact number is configurable) of the selecting entities (sometimes referred to herein simply as entities or sometimes as voters) selected the same option. With the current subject matter, computer-based selections are verifiable in that anyone outside a selection committee (i.e., a group of entities, etc.) can verify that the result has been selected by the specified number of entities and, hence, be convinced that the promotion is decided in a fair manner. Further, with the current subject matter, selections are anonymous in that which entity selected which option is not visible to the public.

For illustration, the following (t, n) selection problem is defined: A promotion committee of n members is formed to decide a certain outcome (e.g., if an employee can be promoted to a senior position). The goal of the selection committee is to select one selection option (e.g., candidate) from a list of m selection options (e.g., candidates). A committee member can select any one of the m options. If at least t members selected the same option, then this selection option is output as the final decision. Otherwise, there is no final decision out of the selection round.

The current subject matter can use a cryptographic building block techniques for group selection processes. Various cryptographic techniques can be utilized including the Identity-Based THreshold Signature (IBTHS) scheme. As used herein, an IBTHS scheme can include various phases. Initially, as part of a system setup phase, a master public key and private key are generated. Thereafter, using a user-defined identity and a group of n signers, a private key is generated for the identity. The private key is split into n shares; one share of the private key is assigned to each signer, so that at least t of the signers need to work together to generate a signature on behalf of the identity. Each signer can generate a partial signature using a key share he/she holds on the input message. The signers can work together to combine at least t partial signatures on the same message to output a threshold signature. The threshold signature can be made available so that selections can be verified to be valid on the identity and the input message. Other IBTHS schemes can be utilized herein including those schemes which are non-interactive. Non-interactive schemes are more efficient than the interactive ones, because in the threshold signature generation phase the signers do not need to talk/interact with each other.

Figure 1:
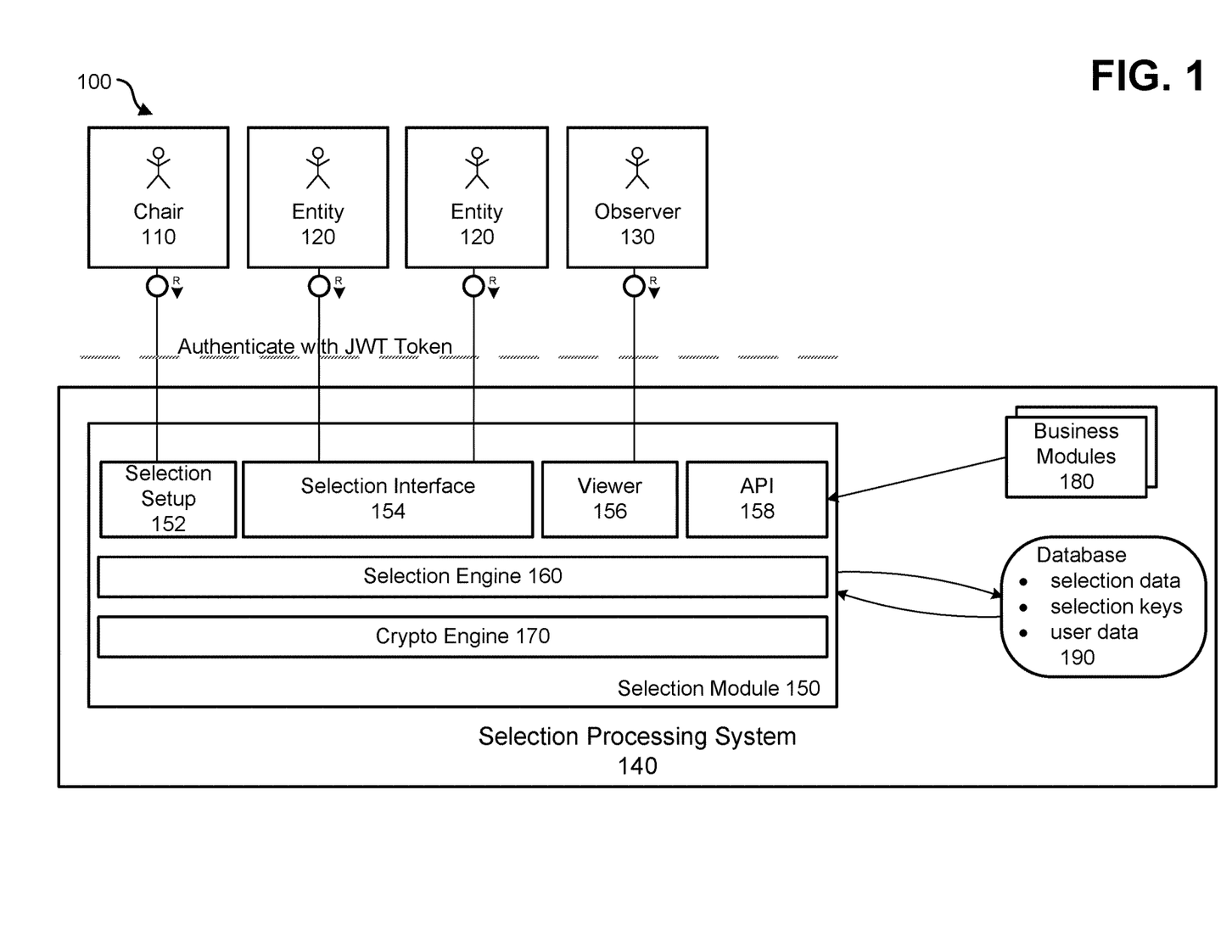
FIG. 1 is a diagram illustrating a computing environment for implementing anonymous and verifiable selections.

FIG. 1 is a diagram 100 of a system providing anonymous and verifiable selections that includes a selection processing system 140 which can be accessible by each of a selection chair 110, entities 120, and an observer 130. Each of the selection chair 110, entities 120, and observer 130 comprises at least one computing system which may access the selection processing system 140 directly or via a network. In some cases, the access to the selection processing system 140 is by way of a JSON Web Token (JWT).

The selection processing system 140 can include various components including a selection module 150 (which in turn includes components). It will be appreciated that the particular arrangement of components within the selection processing system 140 are simply illustrative and the subject matter described herein can also be implemented using different computing architectures/environments if desired.

Referring still to FIG. 1, a crypto engine 170 can be responsible for cryptographic operations, including generation and distribution of selection keys, generation and verification of partial signatures and threshold signature. A selection engine 160 can be responsible for the selection related operations, including setup and execution of the selection process, and generation of the result. A setup module 152 can be an interface to setup and initiate a selection task by the selection chair 110 as further described below. A selection interface 154 provides a means by which the entities 120 can place their selections. A viewer interface 156 can allow for the observer 130 (it will be appreciated that there may also be multiple observers 130) to review selection public information. Public in this regard may refer to a larger group than simply the entities 120 and the selection chair.

An application programming interface (API) 158 can be provided to integrate with various other applications such as business modules 180. The API 158 can allow external applications (i.e., the business module 180) to subscribe to selection status change events including, for example, when a new selection task has been initiated, when a selection task has been canceled, when a selection task is completed with a result. After receiving these events, business module 180 can invoke APIs to query selection task status, and proceed based on the selection status.

The selection processing system 140 can also include a database 190 which, for example, can store information such as selection data, selection keys, user data and the like for use by the selection module 150.

The selection chair 110 can be responsible for setup and to initiate a selection task. This role is often owner of the decision that must be made through the selection process. The entities 120 are designated by the selection chair and can be responsible for the actual selections of the selection options. The observer 130 can have limited access such as only being able to view and verify the final selection result.

Figure 2:
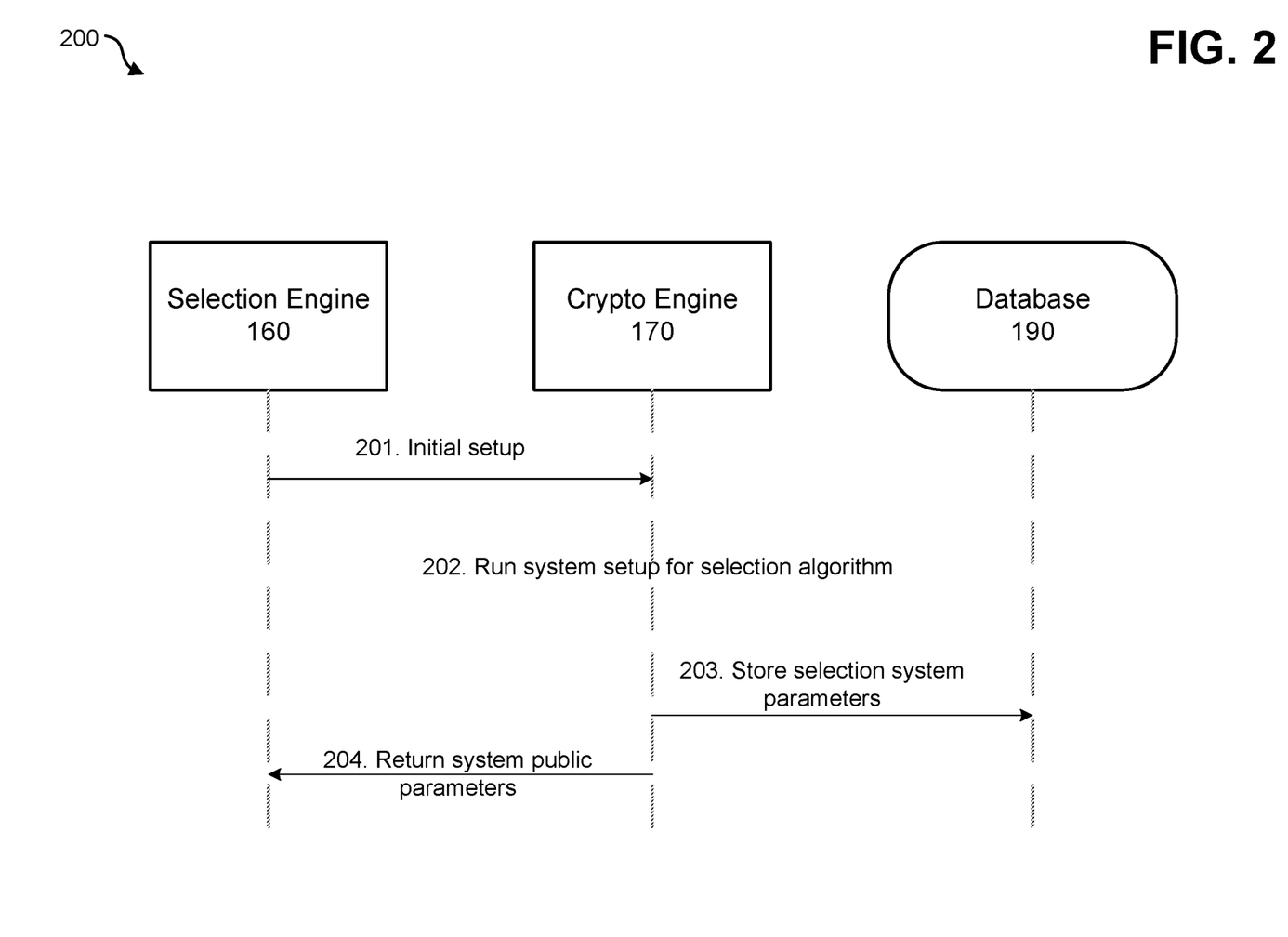
FIG. 2 is a process flow diagram illustrating setup of a system as in FIG. 1.

FIG. 2 is a process diagram 200 illustrating an initial setup process that the selection processing system 140 needs to go through before any selection tasks can be setup. At 201, the selection engine 160 sends an initial setup request to the crypto engine 170. Next, at 202, the crypto engine 170 can run a system setup algorithm for an underlying IBTHS scheme to generate system public and private parameters. The public parameters consist of public key of the IBTHS scheme, and the private parameters can include a private key of the IBTHS scheme. The crypto engine 170, at 203, causes the system public and private parameters to be stored in the database 190. Further, at 204, the crypto engine 170 returns the system public parameters to the selection engine 160.

Figure 3:
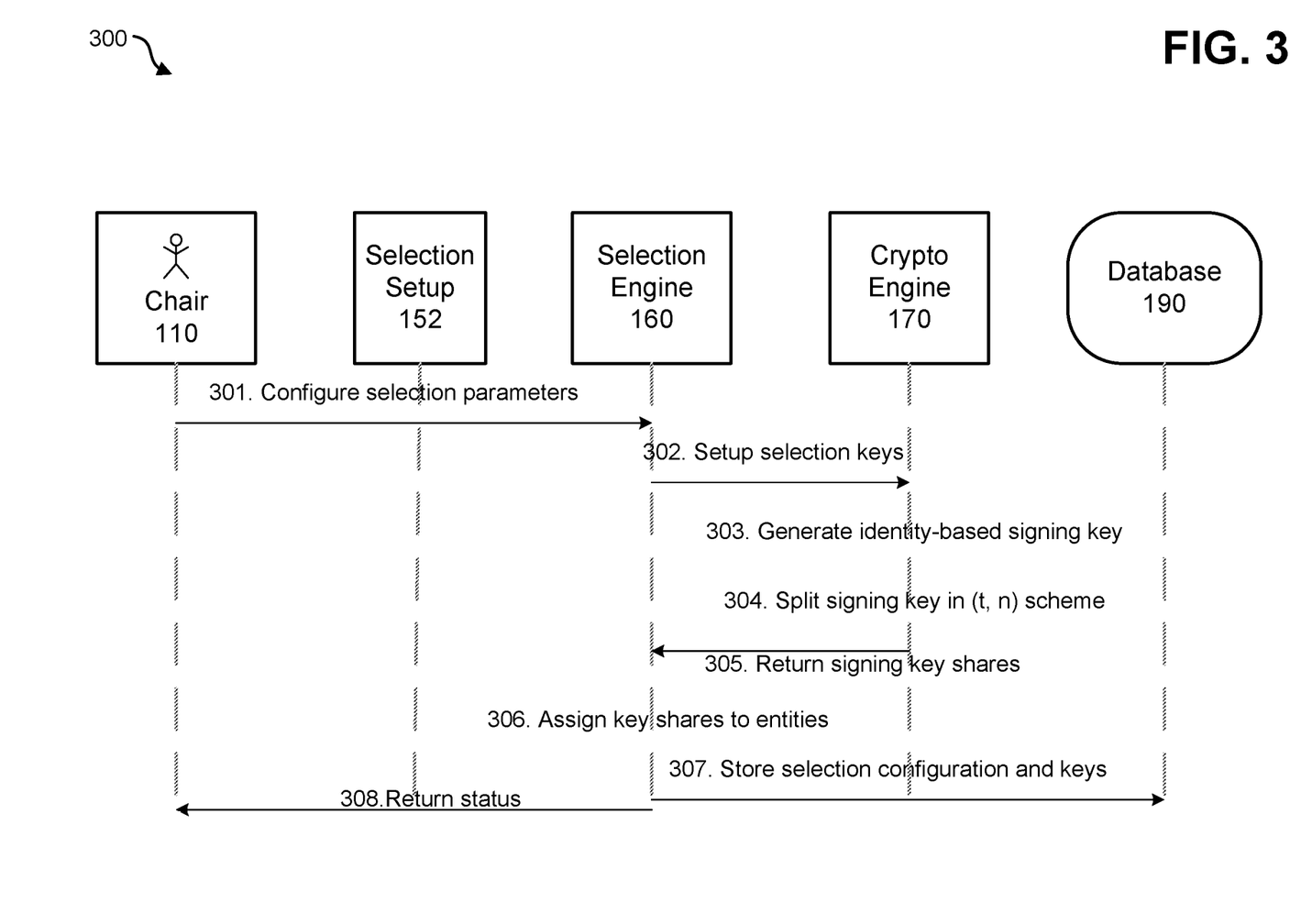
FIG. 3 is a process flow diagram illustrating set up a selection process.

FIG. 3 is a process diagram 300 illustrating a selection setup process. Initially, the selection chair, at 301, configures selection parameters (e.g., identifies entities, whether there will be an observer, what/who is being voted on, etc.) and sends same to the selection engine 160. The selection parameters can, for example, specify a topic and task for voting, such as, for example "Select the next CEO for the organization". The selection chair 110 can specify options to selection from, for example, a list of candidate names. The selection chair 110 can also specify a list of n entities and, in some cases, an identification for such entity (e.g., employee ID, etc.). Further, the selection chair 110 can also specify a threshold t of the selection scheme which relates to how many entities must selection for the same option in order to output that option as final selection result.

The selection engine 160, at 302, then sends an initial setup request to the crypto engine 170. The crypto engine 170 subsequently generates, at 303, an identity-based signing key, splits, at 305 the signing key in (t, n) scheme and, returns, at 305, the signing key shares to the selection engine 160. The selection engine 160 then, at 306, assigns the key shares to the designated entities (which can be stored, at 307, in the database 190 along with selection process configuration information). The selection engine 160 also, at 308, returns the status to the selection chair 110.

Figure 4:
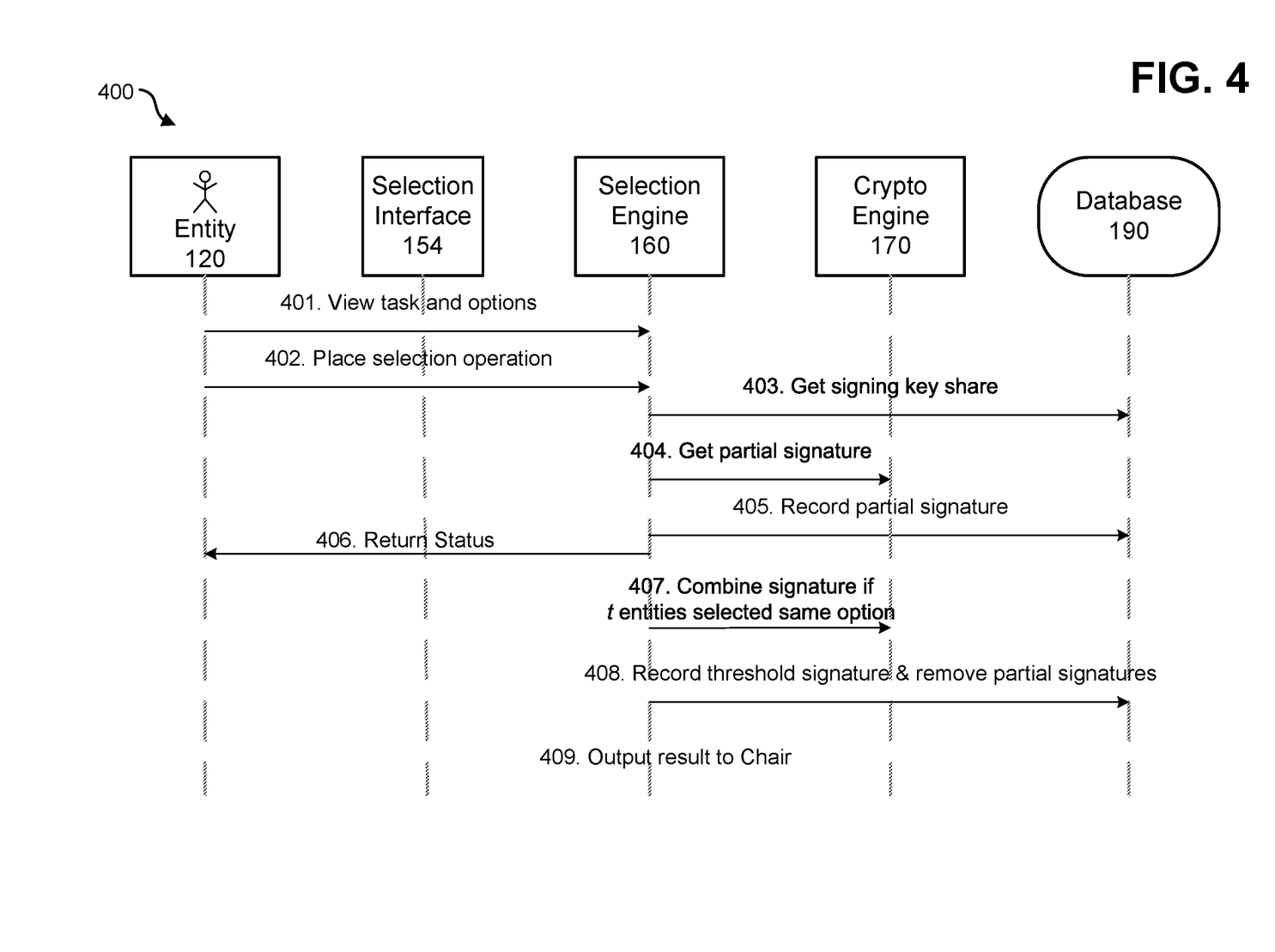
FIG. 4 is process flow diagram illustrating a selection process.

FIG. 4 is a process diagram 400 illustrating a selection process by the entities 120. Initially, at 401, the entity 120 logs on the selection processing system 140 and sees (via the selection interface 154) his or her selection tasks assigned and the associated selection options. The entity 120 then, at 402, places a selection for the one of the options by way of the selection interface 154. To place the selection, the selection engine 150, at 403, first retrieves a corresponding signing key share from the database 190. The selection engine 160 then, at 404, sends a request to the crypto engine 170 to generate a partial signature (which causes the crypto engine 170 to sign the message (the selection option) with the signing key share and to return the partial signature).

Thereafter, at 405, the selection engine 160 records the partial signature in the database 190. Further, at 406, the selection engine 160 returns the selection status to the entity (e.g., an indication that the selection was successful and has been recorded, etc.). If t out of n entities have selected the same option, the selection engine 160, at 407, invokes crypto engine 170 to combine the partial signatures into a threshold signature. The selection engine 160 then, at 408, records the threshold signature (i.e., a full signature) into the database 190 and removes the partial signatures. The final selection result can then be provided, at 409, to the selection chair 110 by the selection engine 160.

Figure 5:
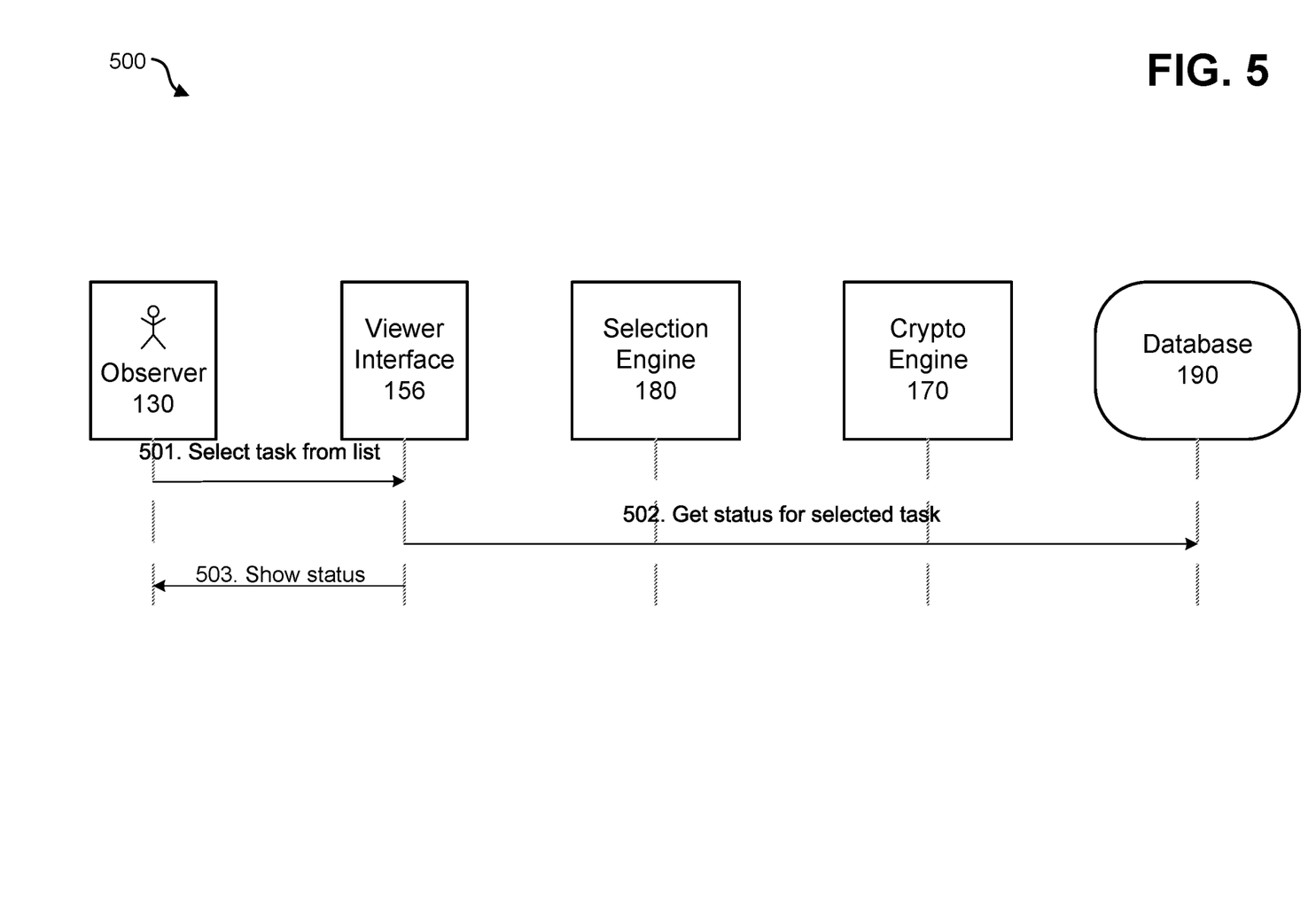
FIG. 5 is a process flow diagram illustrating a process for viewing a current status of a selection process.

FIG. 5 is a process diagram 500 illustrating a workflow in which, at 501, the observer selects a selection task from a list by way of the viewer interface 156. The viewer interface 156, at 502, polls the database 190 for the selected selection task so that the status can be shown, at 503, to the observer 130. Such status information can include, for example, number of selections for a particular outcome (e.g., candidate, etc.), a percentage of selections already completed by the entities 110, and the like. If the selection process is complete, the status information can include a number of entities assigned to the selection task, the final identity-based signature, public parameters necessary for signature verification and/or a timestamp when the last selection was cast.

Figure 6:
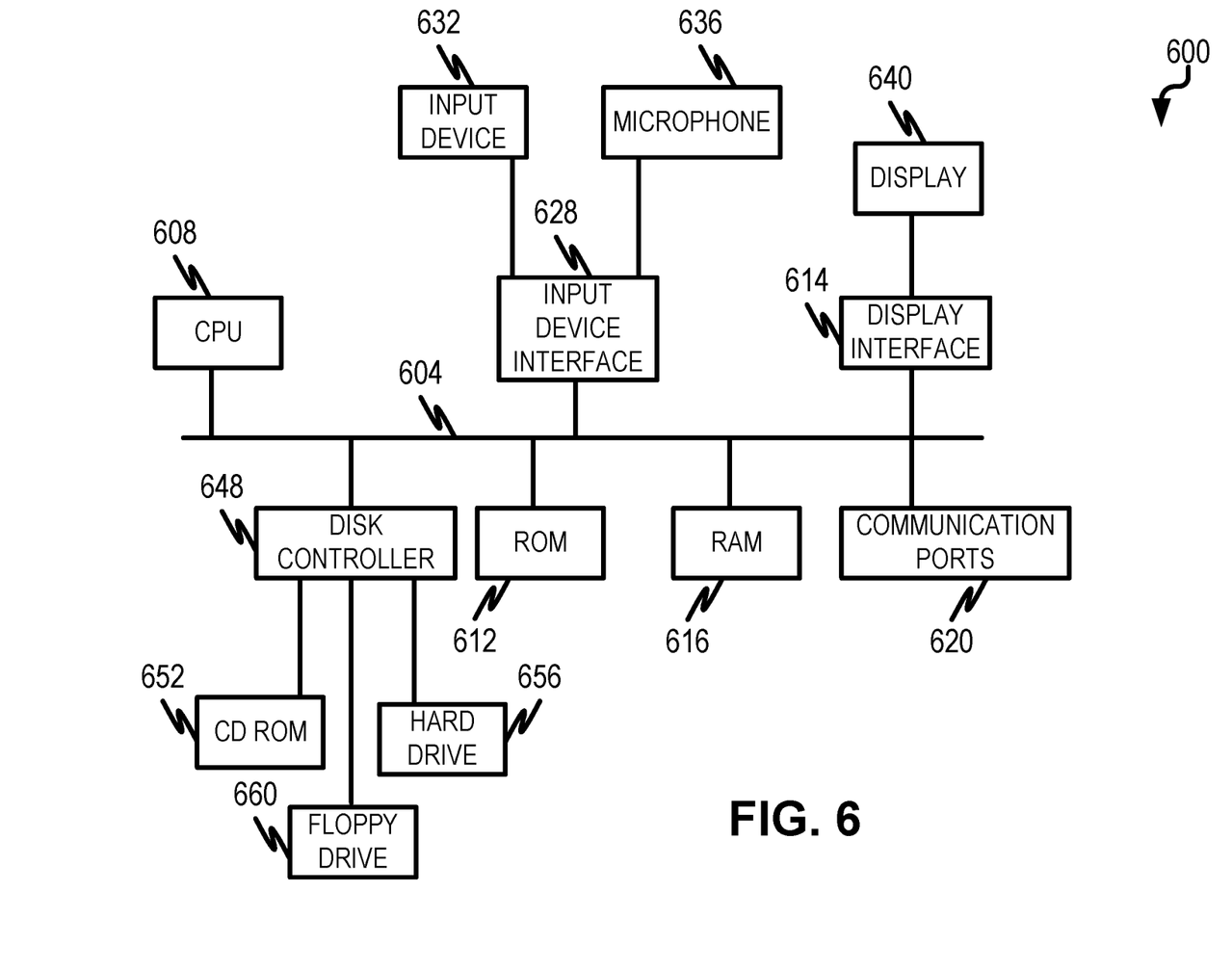
FIG. 6 is a diagram illustrating aspects of a computing device capable of implementing the current subject matter.

FIG. 6 is a diagram 600 illustrating a sample computing device architecture for implementing various aspects described herein. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface with one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the at least one communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 via a display interface 614 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. The input device 632 and the microphone 636 can be coupled to and convey information via the bus 604 by way of an input device interface 628. Other computing devices, such as dedicated servers, can omit one or more of the display 640 and display interface 614, the input device 632, the microphone 636, and input device interface 628.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A cryptographic-based communication method for implementation by one or more data processors forming part of at least one computing device, the method comprising:
    setting up an underlying cryptographic-based identity-based threshold signature scheme, wherein setting up the underlying cryptographic-based identity-based threshold signature scheme comprises generating a public key of the identity-based threshold signature scheme and a private key of the identity-based threshold signature scheme;
    receiving a user-generated input via a graphical user interface, wherein the user-generated input configures selection parameters specifying a selection task, n entities, and a threshold t which needs to be exceeded for the selection task;
    generating an identity-based signing key using the selection task as an identity for the identity-based signing key;
    splitting the identity-based signing key into n different signing key shares;
    assigning the n different signing key shares to the respective n entities;
    storing the n different signing key shares in a database;
    receiving user-generated messages encapsulating selections from the n entities for the selection task, the selection task having a first selection option and a different second selection option;
    retrieving, for the selections from the n entities for the selection task, the n different signing key shares assigned to the respective n entities from the database;
    generating, for the selections from the n entities for the selection task, respective partial signatures by signing the user-generated messages using the n different signing key shares assigned to the respective n entities;
    storing the partial signatures in the database;
    combining the partial signatures into a threshold signature if a number of entities that selected the first selection option for the selection task exceeds the threshold t;
    storing the threshold signature in the database; and
    providing, in response to the combining, data characterizing results of the selection task, the data comprising at least the threshold signature, wherein the providing comprises transmitting the data characterizing results of the selection task to a remote computing system.

2. The method of claim 1, wherein the providing comprises at least one of:
    displaying the data characterizing results of the selection task, storing the data characterizing results of the selection task in a physical persistence, or loading the data characterizing results of the selection task into a memory.

3. The method of claim 1 further comprising:
    storing the public key of the identity-based threshold signature scheme and the private key of the identity-based threshold signature scheme in the database.

4. The method of claim 1 further comprising:
    removing the partial signatures from the database once the threshold signature is stored in the database.

5. The method of claim 1, wherein the selection task comprises a hiring of one of a plurality of potential job candidates.

6. The method of claim 1, wherein the selection task comprises a promotion decision for an existing employee.

7. The method of claim 1, wherein the selection task comprises a performance review for an existing employee.

8. The method of claim 1 further comprising:
    polling the database to obtain status information for the selection task, the status information comprising a percentage of selections completed by the n entities.

9. The method of claim 8, wherein if the n entities have selected one of the first selection option or the second selection option, the status information comprises at least one of: a number of entities selecting the first selection option and a number of entities selecting the second selection option, the threshold signature, public parameters consisting of the public key of the identity-based threshold signature scheme that are necessary for signature verification, or a timestamp when a last member of the n entities selected the first selection option or the second selection option.

10. A cryptographic-based communication system comprising:
    at least one data processor; and
    memory storing instructions which, when executed by the at least one data processor, result in operations comprising:
        setting up an underlying cryptographic-based identity-based threshold signature scheme, wherein setting up the underlying cryptographic-based identity-based threshold signature scheme comprises generating a public key of the identity-based threshold signature scheme and a private key of the identity-based threshold signature scheme;

receiving a user-generated input via a graphical user interface, wherein the user-generated input configures selection parameters specifying a selection task, n entities, and a threshold t which needs to be exceeded for the selection task;

generating an identity-based signing key using the selection task as an identity for the identity-based signing key;

splitting the identity-based signing key into n different signing key shares;

assigning the n different signing key shares to the respective n entities;

storing the n different signing key shares in a database;

receiving user-generated messages encapsulating selections from the n entities for the selection task, the selection task having a first selection option and a different second selection option;

retrieving, for the selections from the n entities for the selection task, the n different signing key shares assigned to the respective n entities from the database;

generating, for the selections from the n entities for the selection task, respective partial signatures by signing the user-generated messages using the n different signing key shares assigned to the respective n entities;

storing the partial signatures in the database;

combining the partial signatures into a threshold signature if a number of entities that selected the first selection option for the selection task exceeds the threshold t;

storing the threshold signature in the database; and providing, in response to the combining, data characterizing results of the selection task, wherein the providing comprises transmitting the data characterizing results of the selection task to a remote computing system.

11. The system of claim 10, wherein the providing further comprises at least one of:
   displaying the data characterizing results of the selection task, storing the data characterizing results of the selection task in a physical persistence, or loading the data characterizing results of the selection task into the memory.

12. The system of claim 10, wherein the operations further comprise: storing the public key of the identity-based threshold signature scheme and the private key of the identity-based threshold signature scheme in the database.

13. The system of claim 10, wherein the operations further comprise:
   removing the partial signatures from the database once the threshold signature is stored in the database.

14. The system of claim 10, wherein the selection task comprises a hiring of one of a plurality of potential job candidates.

15. The system of claim 10, wherein the selection task comprises a promotion decision for an existing employee.

16. The system of claim 10, wherein the selection task comprises a performance review for an existing employee.

17. A non-transitory computer program product for cryptographic-based communication, the non-transitory computer program product storing instructions which, when executed by at least one data processor forming part of at least one computing device, result in operations comprising:
   setting up an underlying cryptographic-based identity-based threshold signature scheme, wherein setting up the underlying cryptographic-based identity-based threshold signature scheme comprises generating a public key of the identity-based threshold signature scheme and a private key of the identity-based threshold signature scheme;
   receiving, from a selection chair, a user-generated input via a graphical user interface, wherein the user-generated input configures selection parameters specifying a selection task comprising at least a first selection option and a second selection option, n entities, and a threshold t which needs to be exceeded for the selection task;
   generating an identity-based signing key using the selection task as an identity for the identity-based signing key;
   splitting the identity-based signing key into n different signing key shares;
   assigning the n different signing key shares to the respective n entities;
   storing the n different signing key shares in a database;
   receiving user-generated messages encapsulating selections from the n entities for the selection task;
   retrieving, for the selections from the n entities for the selection task, the n different signing key shares assigned to the respective n entities from the database;
   generating, for the selections from the n entities for the selection task, respective partial signatures by signing the user-generated messages using the n different signing key shares assigned to the respective n entities;
   storing the partial signatures in the database;
   combining the partial signatures into a threshold signature if a number of entities that selected the first selection option for the selection task exceeds the threshold t;
   recording, in the database, the threshold signature;
   removing, in response to the recording, the partial signatures from the database;
   providing to at least the selection chair, and in response to the combining, data characterizing results of the selection task, wherein the providing comprises transmitting the data characterizing results of the selection task to a remote computing system;
   receiving a request for status information for the selection task from an observer via a viewer interface;
   polling from the database for the status information, wherein the status information comprises a number of entities assigned to the selection task and the threshold signature; and
   providing the status information to the observer.

18. The computer program product of claim 17, wherein the providing comprises at least one of: displaying the data characterizing results of the selection task, storing the data characterizing results of the selection task in a physical persistence, or loading the data characterizing results of the selection task into a memory.

19. The computer program product of claim 18, wherein the operations further comprise storing the public key of the identity-based threshold signature scheme and the private key of the identity-based threshold signature scheme in the database.

20. The computer program product of claim 17, wherein the selection task comprises at least one of: hiring of one of a plurality of potential job candidates, a promotion decision for an existing employee, or a performance review for an existing employee.

* * * * *